R. P. FARIES.
SPARK-ARRESTER.

No. 172,406. Patented Jan. 18, 1876.

WITNESSES:
E. Wolff
A. F. Terry

INVENTOR
R. P. Faries
BY Munn & Co.
ATTORNEYS.

N. PETERS, PHOTO-LITHOGRAPHER, WASHINGTON, D.C.

UNITED STATES PATENT OFFICE.

ROYAL P. FARIES, OF WICHITA, KANSAS.

IMPROVEMENT IN SPARK-ARRESTERS.

Specification forming part of Letters Patent No. 172,406, dated January 18, 1876; application filed July 10, 1875.

*To all whom it may concern:*

Be it known that I, ROYAL P. FARIES, of Wichita, Sedgwick county, Kansas, have invented a new and Improved Spark-Arrester, of which the following is a specification:

My invention consists of a wire-netting section in the smoke-stack for the escape of the smoke, while the cinders are allowed to pass above it into a trap formed by a close cover over the pipe and a contraction of the top of the latter, from which they are conducted back into the smoke-arch through one or more pipes passing down the side of the smoke-pipe through the saddle.

Figure 1:
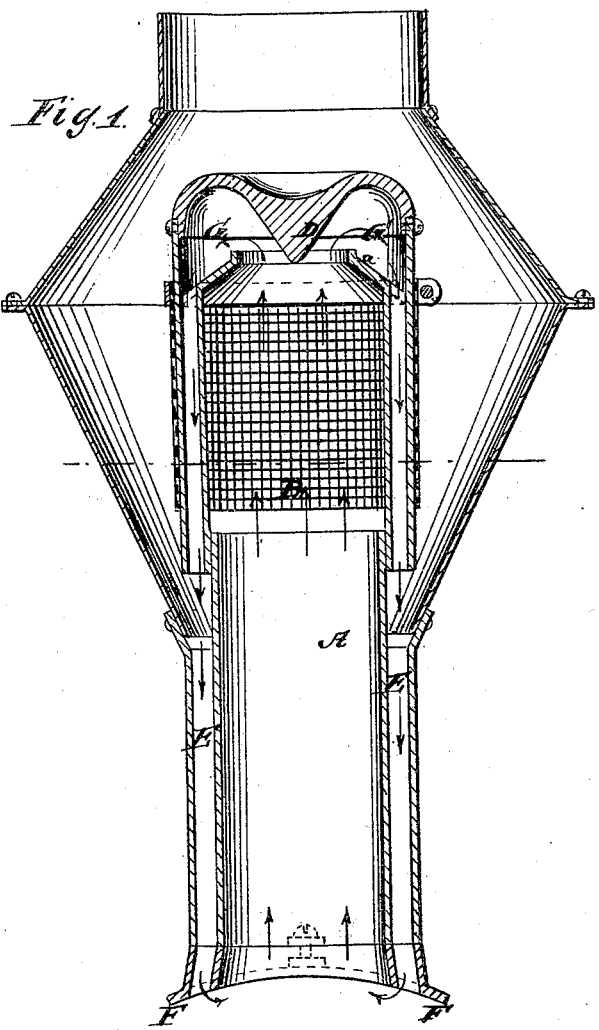
Figure 2:
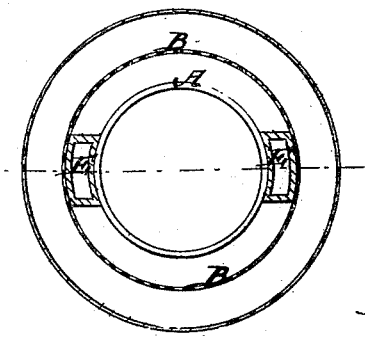

Figure 1 is a sectional elevation of my improved spark-arrester, taken on the line $x\,x$, Fig. 2; and Fig. 2 is a horizontal section taken on the line $y\,y$, Fig. 1.

Similar letters of reference indicate corresponding parts.

A is the smoke-pipe, having the converging top $a$; B, the wire section in it for the escape of the smoke; C, the trap at the top of the smoke-pipe, into which the cinders are projected after striking the conical cover D; and E represents the pipes passing down the sides of the smoke-pipe, through the saddle F, into the smoke-arch.

Having thus described my invention, I claim as new and desire to secure by Letters Patent—

The combination, with smoke-pipe, cinder-trap, and deflector or cover, of the wire section B, arranged directly under the converging top $a$ of the smoke-pipe, as and for the purpose specified.

ROYAL P. FARIES.

Witnesses:
W. A. RICHEY,
B. HOLLOWAY.